US012735849B2

(12) United States Patent
Kennedy

(10) Patent No.: US 12,735,849 B2
(45) Date of Patent: Sep. 15, 2026

(54) PAVER WORK MACHINE WITH A THERMAL MANAGEMENT SYSTEM

(71) Applicant: Deere & Company, Moline, IL (US)

(72) Inventor: Thomas L. Kennedy, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 511 days.

(21) Appl. No.: 18/456,637

(22) Filed: Aug. 28, 2023

(65) Prior Publication Data

US 2025/0075447 A1 Mar. 6, 2025

(51) Int. Cl.
*E01C 19/48* (2006.01)
*B60H 1/00* (2006.01)
*B60H 1/32* (2006.01)

(52) U.S. Cl.
CPC ..... *E01C 19/4873* (2013.01); *B60H 1/00407* (2013.01); *B60H 1/32281* (2019.05); *E01C 2301/10* (2013.01)

(58) Field of Classification Search
CPC ............. E01C 19/4876; E01C 2301/10; B60H 1/00407; B60H 1/32281
USPC ........................................ 404/83–118, 72–79
See application file for complete search history.

(56) References Cited

U.S. PATENT DOCUMENTS 5,096,331 A 3/1992 Raymond
5,899,630 A * 5/1999 Brock ..................... E01C 19/48 404/95
7,654,772 B1 * 2/2010 Zimmerman ....... E01C 19/1054 404/90
8,356,958 B2 1/2013 Braun et al.
9,028,167 B2 * 5/2015 Buschmann .......... E01C 19/002 404/101
11,242,658 B2 2/2022 Kappel et al.
11,626,632 B2 4/2023 Whiteman et al.
2011/0318102 A1 * 12/2011 Utterodt .................. E01C 19/48 404/83
2013/0051912 A1 * 2/2013 Buschmann ............ E02F 9/226 404/83
2015/0337505 A1 * 11/2015 Stallgies ................. E01C 19/48 404/118
2022/0032733 A1 2/2022 Spangler et al.

FOREIGN PATENT DOCUMENTS

DE 102022121023 A1 * 2/2024 ............. E01C 19/48
EP 4353908 A1 * 4/2024 ............... F24H 7/02

* cited by examiner

*Primary Examiner* — Raymond W Addie

(57) ABSTRACT

A paver work machine comprises of a hopper, a screed, a thermal manage system with a heat pump, and a controller. The hopper receives and distributes paving material, and the screed levels the paving material on the ground surface. The thermal management system includes a thermal energy circuit for circulating a medium through an evaporator, a compressor, a condenser, and an expansion device. The compressor receives the medium from the evaporator and is operable to compress and circulate the medium through the thermal energy circuit. The evaporator receives the medium from the expansion device and is operable to transfer heat to the medium. The condenser is operable to desorb heat form the medium and adapted to transfer heat desorbed from the medium to one or more the hopper or the screed. A controller controls heat transfer between the condenser and one or more of the screed and the hopper.

20 Claims, 5 Drawing Sheets

100
137
160
165
135
145
155
102
175
140
150
130
120
115
120

PAVER WORK MACHINE WITH A THERMAL MANAGEMENT SYSTEM

TECHNICAL FIELD

The disclosure generally relates to a paver work machine with a thermal management system including a heat pump.

BACKGROUND

A paver work machine comprises of three primary functions when laying down paving material. The propulsion system traverses the paver work machine over the area paved. A material handling system moves the paving material from a hopper to a screed wherein the screed levels and profiles the material on a surface. Paver work machines have specific environmental requirements that must be met in order to ensure proper operation and performance, The performance indicators include achieving proper placement, finish, material consistency and compaction of the paving material. Paver work machines are design to operate in a temperature of around 50 to 100 degrees Fahrenheit. Extreme temperatures, either too hot or too cold, can affect the quality of the paving material and can make it difficult to achieve a smooth and even surface. For example, the paving material must be maintained at a minimum temperature and be evenly heated to avoid paving material segregation where fine material separate from medium or larger chunk aggregate. Additionally, excessive wind conditions can cause temperature variability from the outer surface of a pile of paving material to the inner core of the pile. High humidity may also lead to issues such as clogging and poor compaction. Low humidity can cause the material to dry out too quickly, leading to cracking and other defects. These and other environmental conditions make paving surfaces sensitive to thermal variations. With the onset of hybrid powered paver work machines and all-electric work machines, efficient use of energy consumption becomes vital to optimize the use of energy. A battery may be used as the prime mover, supplemental heating to thermally manage paving material, or both. Therein lies an opportunity to improve the quality of operation and function of all-electric and hybrid-type paver work machines while conserving its power usage.

SUMMARY

An objective of the disclosure is to provide a paver work machine comprising an improved thermal management system. There is further provided a method of managing thermal energy and redistributing the thermal energy throughout the paver work machine.

A paver work machine comprises of a hopper, a screed, a heat pump system, and a controller. The hopper is adapted to receive and distribute paving material. The screed is adapted to level the paving material on a ground surface. The thermal management system with a heat pump includes a thermal energy circuit for circulating a medium through an evaporator, a compressor, a condenser, and an expansion device. The compressor is positioned within the thermal energy circuit to receive the medium from the evaporator and is operable to compress and circulate the medium through the thermal energy circuit. The condenser is positioned within the thermal energy circuit to receive the medium from the compressor. The expansion device is positioned within the thermal energy circuit to receive the medium from the condenser and is operable to control a pressure of the medium in the thermal energy circuit. The evaporator is positioned within the thermal energy circuit to receive the medium from the expansion device and is operable to transfer heat to the medium. The condenser is operable to desorb heat form the medium and adapted to transfer heat desorbed from the medium to one or more the hopper or the screed. A controller is adapted to control heat transfer between the condenser and one or more of the screed and the hopper.

The thermal energy circuit comprises a closed-loop system that allows for continuous circulation of the medium and exchange of thermal energy. The circulation of the medium may flow in one direction.

The heat pump system may further comprise of a pump circulating a heating fluid through a heating fluid circuit, between the condenser and either the screed, the hopper, or both. The controller controls the rate of diversion of heat by adjusting a flow rate of the heating fluid output by the pump.

The compressor of the heat pump system is powered by a prime mover. The prime mover may be an electric power source. The heat pump system may further comprise an air distribution system for directing cooled air from the evaporator to a cool air outlet.

The controller operates transferring heat between the condenser and one of the screed and the hopper within a defined ambient air temperature range.

The heating fluid circuit may engage a back surface of one of hopper and the screed.

The heat pump system further comprises a pump circulating a heating fluid through a heating fluid circuit between the condenser and the longitudinal conveyer 150.

The heat pump system may further comprise a blower for distributing heated air around the heating fluid circuit, toward a surface contacting the paving material.

The heat pump system may further comprise a blower for distributing air around the thermal energy circuit, towards a surface contacting the paving material.

Accordingly, the method of managing thermal energy in a paver work machine includes the following steps. In a first step, the method includes providing a heat pump system with a thermal energy circuit circulating a medium through an evaporator, a compressor, a condenser, and an expansion device. In a next step, the method includes receiving the medium from the evaporator by the compressor. Next, the method includes compressing and circulating the medium through the thermal energy circuit. In a next step, the method includes desorbing heat from the medium by the condenser and subsequently transferring the desorbed heat from the condenser to one of the screed and the hopper. The method then includes controlling a flow of the medium from the condenser by the expansion device. The method then includes receiving the medium from the expansion device by the evaporator and transferring heat to the medium by the evaporator. The method may further include circulating a heating fluid by a pump in a heating fluid circuit between the condenser and one of the screed and the hopper to transfer the desorbed heat from the condenser to one of the screed and the hopper, wherein a controller controls a rate of diversion of the heat by adjusting a flow rate of the heating fluid output by the pump. Next, the method may include directing the cooled air desorbed of heat from the medium by the evaporator through an air distribution system to a cool air outlet. Transferring the desorbed heat from the condenser to either the screed or the hopper may include a blower for distributing heated air sourced from air near one of the thermal energy circuit and the heating fluid circuit, towards a surface contacting the paving material.

The above features and advantages and other features and advantages of the present teachings are readily apparent from the following detailed description of the best modes for carrying out the teachings when taken in connection with the accompanying drawings.

DETAILED DESCRIPTION

Figure 1:
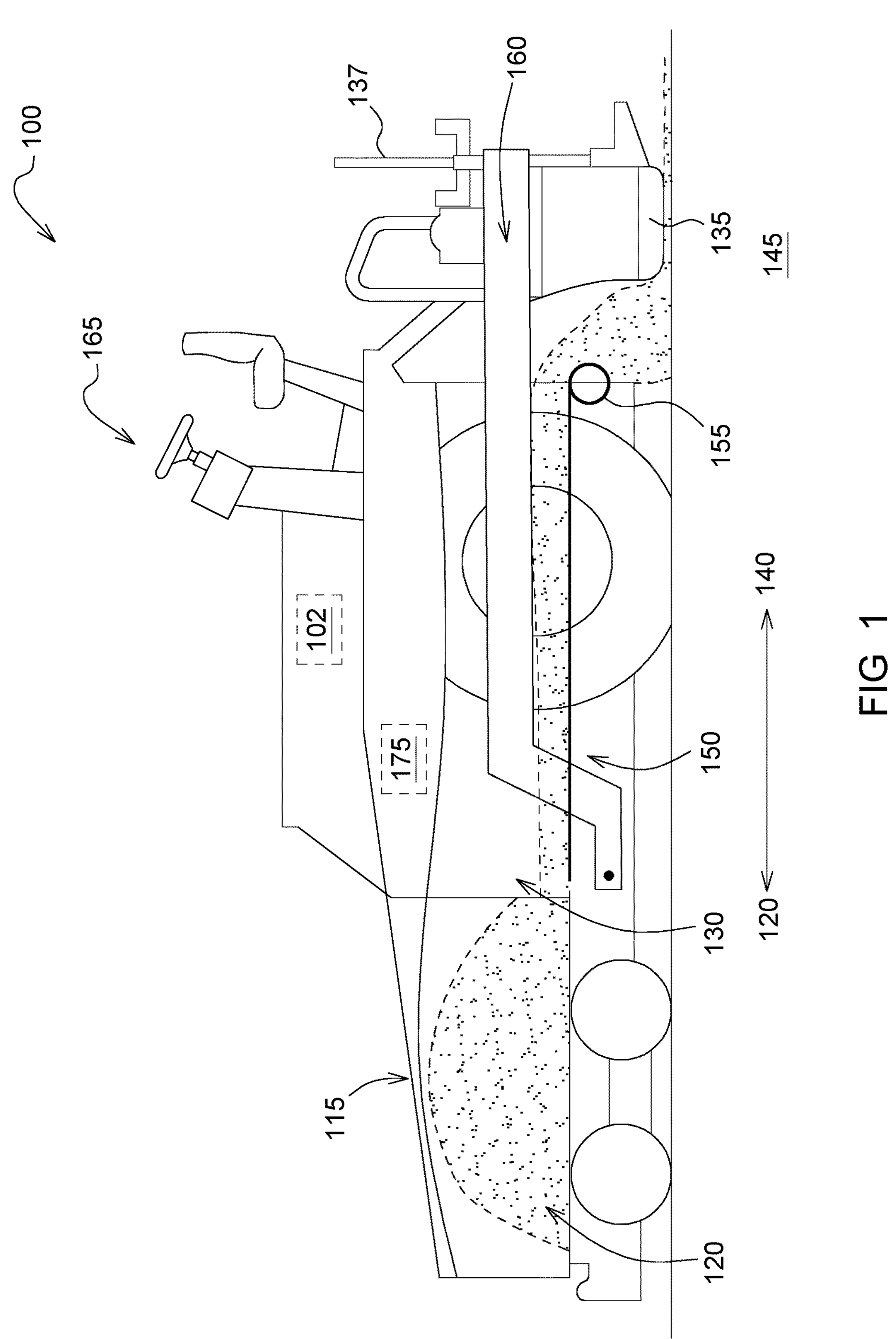
FIG. 1 is a line schematic of a paver work machine.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation but should not be construed as limiting. The terms "longitudinal" and "transverse" are usually determined with reference to the fore-and-aft direction of the implement relative to the direction of travel during operation and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

As used herein, the term "controller" is a computing device including a processor and a memory. The "controller" may be a single device or alternatively multiple devices. The controller may further refer to any hardware, software, firmware, electronic control component, processing logic, processing device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Referring to the schematic side view of FIGS. 1, a paver work machine 100 is disclosed. The paver work machine 100 comprises of a wheeled undercarriage 110 powered by a prime mover 102 to propel the paver work machine. An alternative embodiment may comprise of a paver work machine 100 with a tracked undercarriage. The paver work machine 100 comprises a hopper 115 adapted to receive and distribute a hot mix of paving material 120 such as asphalt (as shown by hashed lines). The hopper 115 is located at a fore portion 125 of the undercarriage 110. The hopper 115 temporarily stores paving material 120 during paving wherein the paving material 120 is typically added to the hopper 115 from a truck.

The paver work machine 100 further comprises a screed 135 arranged at a rear portion 140 of the paver work machine 100. The screed 135 is configured to level and compact out paving material 120 disposed on the ground from the hopper 115 and in front of the screed 135, as the paver work machine 100 traverses across the ground surface 145. This paving material 120 has been transported from the hopper 115 to the ground 145 through a conveyor 150. The conveyer 150, extends longitudinally within and through the undercarriage 110 or frame of the paver work machine 100 and towards a lateral distribution assembly 155 near the rear portion 140 of the undercarriage 110. In one embodiment, the lateral distribution assembly 155 may be driven hydraulically by an auger, for distributing paving material 120 across the width of the screed 135. The lateral distribution assembly 155 is arranged in front of a screed 135 as the screed is towed by towing bars (not shown).

An operator station 165 is located on the upper side of the undercarriage 110 and comprises a user interface. The operator station 165 is typically open to air but may be enclosed or simply have a roof to shield the operator from environmental conditions. In an embodiment of a hybrid type paver work machine, the prime mover 102 may comprise of a combustion engine with a generator to supply electric heating for the paving material 120. In another embodiment, the prime mover 102 may comprise of a hybrid configuration with the combustion engine, generator, and a battery 175 to supply heating for the paving material 120. In a preferred embodiment, the prime mover 102 may comprise of an all-electric paver work machine for mobilization and heating of the paving material 120.

A screed actuator 137 may lift and lower the screed 135 with respect to the ground surface 145. One or more screed actuators 137 are coupled to a screed lifting arm 160 wherein actuation of the screed actuator 137 (e.g. a hydraulic cylinder) causes the screed lifting arm 160 to rotate about a pivot axis 142 and thereby enabling lifting or lowering of the screed 135 with respect to ground surface 145.

Figure 2:
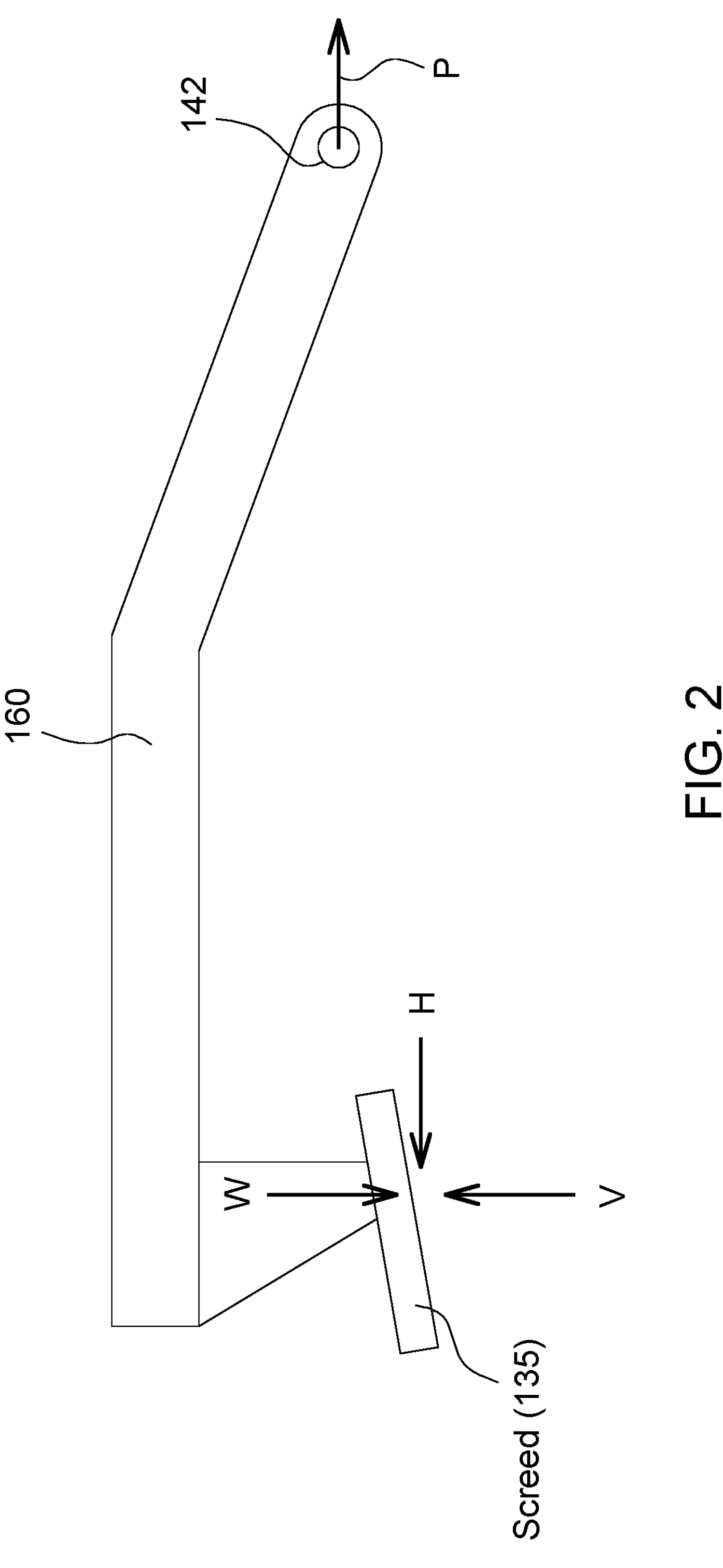
FIG. 2 is a line schematic of the tow bar shown in FIG. 2A.

The screed 135 leveling the paving material 120 on the ground surface 145 includes a base plate portion which may comprise of heating elements, such as portions of the heat pump system 305 disclosed herein. Extension screeds (not shown) may further be laterally extended and shifted inwardly or outwardly from a base portion of the screed through motors or hydraulic systems driven by the prime mover 102 or electric battery 175. FIG. 2 discloses a schematic of the screed lifting arm 160 and the forces associated with it. The weight (W) of the screed 135, or more specifically the screed plate, provides a gravitational force to flatten and compact the surface 145 underneath. The vertical resistance (V) on the screed 135 and horizontal resistance (H) on the screed are the other forces encountered as the screed is pulled by the towing force (P) along the ground surface 145. A compaction force and leveling height can be adjusted by pivoting the screed lifting arm 160 about the pivot axis 142.

Figure 3A:
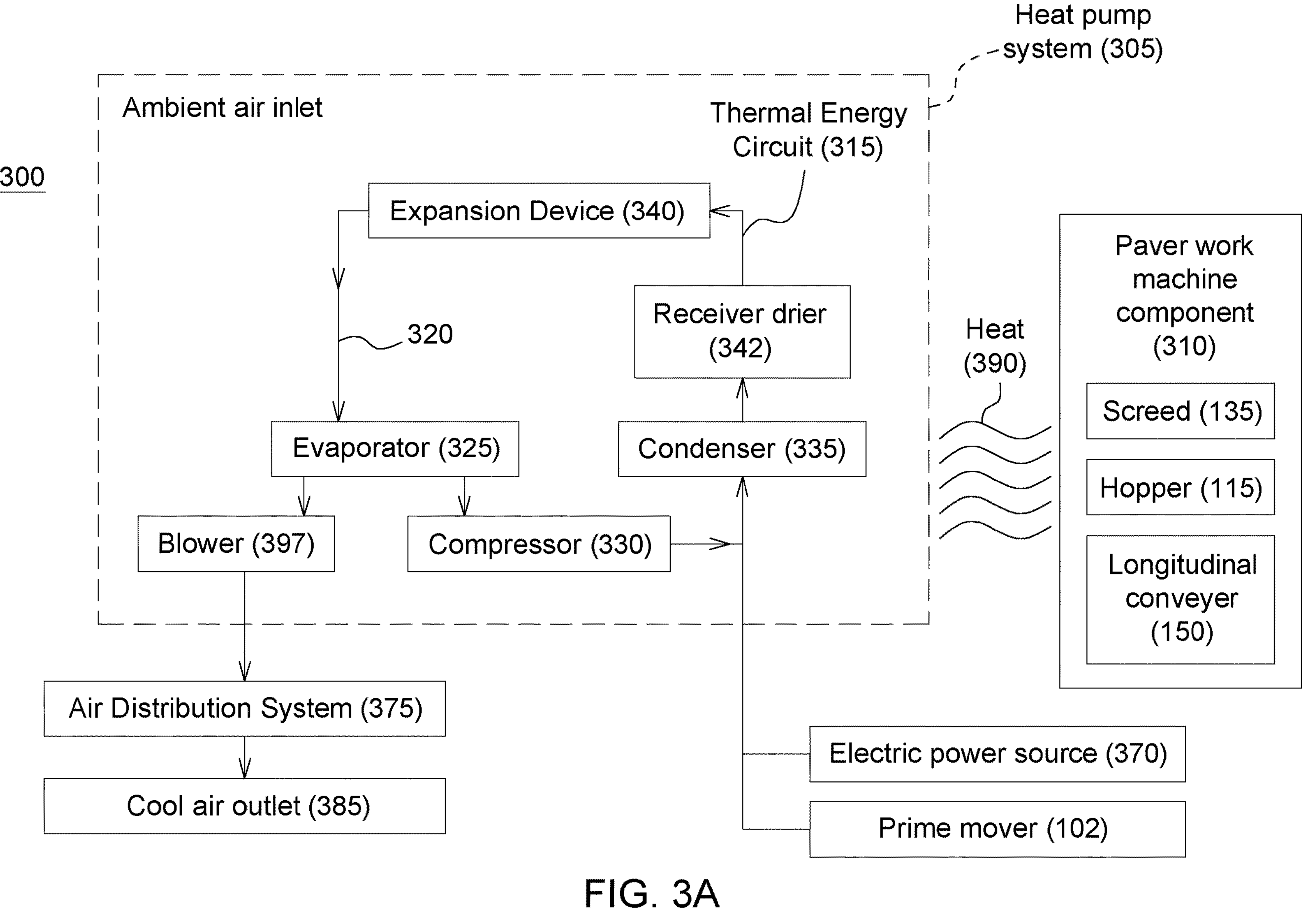
FIG. 3A is a high-level schematic of the thermal management system, according to a first embodiment, that includes a heat pump on a paver work machine.

The thermal management system 300 (schematically shown in FIGS. 3A and 3B), including a heat pump system 305, is adapted thermally manage and redistribute thermal energy from air and towards a paver work machine component 310 or other surface in contact with paving material 120. The heat pump system 305 includes a thermal energy circuit 315 for circulating a medium 320 (e.g. a refrigerant) through an evaporator 325, a compressor 330, a condenser 335, and an expansion device 340. The evaporator 325 functions by extracting thermal energy from its immediate surroundings, such as air. This air may include ambient air, or air internal to the paver work machine 100, such as a battery cell. As the air surrounding an evaporator's coils is desorbed of heat, the medium 320 within begins to vaporize. As the medium 320 continues to absorb heat, it eventually becomes fully vaporized and is transported to the compressor 330. The compressor 330 is positioned within the thermal energy circuit 315 to receive the medium 320 from the evaporator 325 and is operable to compress and circulate the medium 320 through the thermal energy circuit 315. The compressor 330 compresses the gaseous medium to a high-pressure and high-temperature state before moving towards the condenser 335.

The condenser 335 is positioned within the thermal energy circuit 315 to receive the medium 320 from the compressor 330. The condenser 335 functions to remove thermal energy from the medium, typically by passing it over a set of fins that facilitate heat exchange with the air or fluid passing over it. Once desorbed of thermal energy, the medium will condense back into liquid form and be ready to continue the cycle, beginning once more at the evaporator. More specifically, the condenser 335 is operable to desorb heat 390 form the medium 320 and adapted to transfer heat 390 desorbed from the medium 320 to one or more the hopper 115 or the screed 135.

The expansion device 340 is positioned within the thermal energy circuit 315 to receive the medium 320 from the condenser 335 and is operable to control the flow of the medium 320 into the evaporator 325. The evaporator 325 is positioned within the thermal energy circuit 315 to receive the medium 320 from the expansion device 340 and is operable to transfer heat 390 to the medium 320. A controller 345 is adapted to control the heat transfer between the condenser 335 and one or more of the screed 135 and the hopper 115.

The thermal energy circuit 315 comprises a closed-loop system 350 that allows for continuous circulation of the medium 320 and exchange of thermal energy. The circulation of the medium 320 may flow in one direction as indicated by the arrows. A receiver drier 342 may further be included in the thermal energy circuit 315 to filter the medium 320 and absorb moisture. The function of the receiver drier 342 is to protect the heat pump system 305 from moisture and contaminants that may cause damage. Moisture in the system can lead to the formation of ice or corrosion, while contaminant such a dirt or metal particles can clog the expansion device 340*m* or damage the compressor 330. The receiver drier 342 may further serve as a storage tank for the medium when the heat pump system is not in use. The thermal management system 300 with the heat pump 305 advantageously capitalizes on sourcing thermal energy from a paver work machine's natural functional environment. That is, heat pump systems typically have a higher coefficient of performance in moderate climates. These moderate climates are similar to environmental constraints of paver work machines.

Figure 3B:
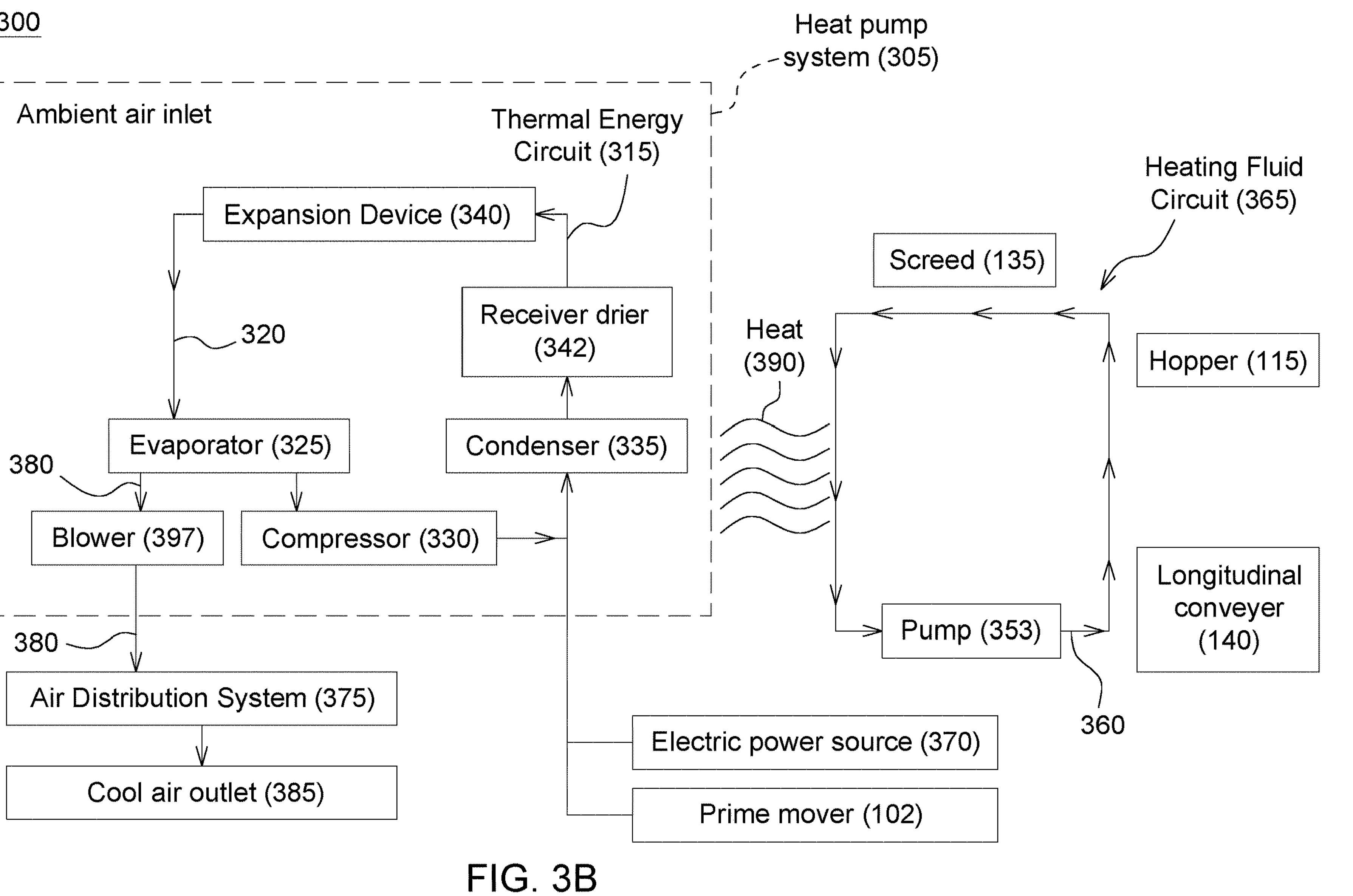
FIG. 3B is a high-level schematic of the thermal management system, according to a second embodiment, that includes a heat pump on a paver work machine.

According to the second embodiment shown in FIG. 3B, the pump system 305 may further comprise of a pump 355 circulating a heating fluid 360 through a heating fluid circuit 365, between the condenser 335 and either the screed 135, the hopper 115, or both. The controller 345 controls the rate of diversion of heat 390 by adjusting a flow rate of the heating fluid 360 output by the pump 355.

The heating fluid circuit 365 may engage with a back surface 395 of one of hopper 115 and the screed 135.

The heat pump system 305 further comprises the pump 355 circulating a heating fluid 360 through a heating fluid circuit 365 between the condenser 335 and the longitudinal conveyer 150.

The compressor 330 of the heat pump system 305 is powered by a prime mover 102. The prime mover 102 may be an electric power source 370, such as a battery 175. The heat pump system 305 may further comprise an air distribution system 375 for directing cooled air 380 from the evaporator 325 to a cool air outlet 385. The air distribution system 375 may comprise of ducts adapted to channel cool air through the frame of the paver work machine 100 such as the compartment where the prime mover 102 is located and may further include a fan or blower to push the cooled air towards the operator station 165.

The controller 345 operates transferring heat 390 between the condenser 335 and one of the screed 135 and the hopper 115 when within a defined ambient air temperature range 505. The heating efficiency of heat pump advantageously coincides with the general operating temperature range of paver work machines. Furthermore, a heat pump has a substantially higher coefficient of performance than traditional resistance heating devices such as electric heaters.

The heat pump system 305 may further comprise a blower 397 for distributing heated air from around the heating fluid circuit 365, toward a surface 395 contacting the paving material 120.

The heat pump system 305 may further comprise a blower 397 for distributing heated air around the thermal energy circuit 315, towards a surface 395 contacting the paving material 120.

Figure 4:
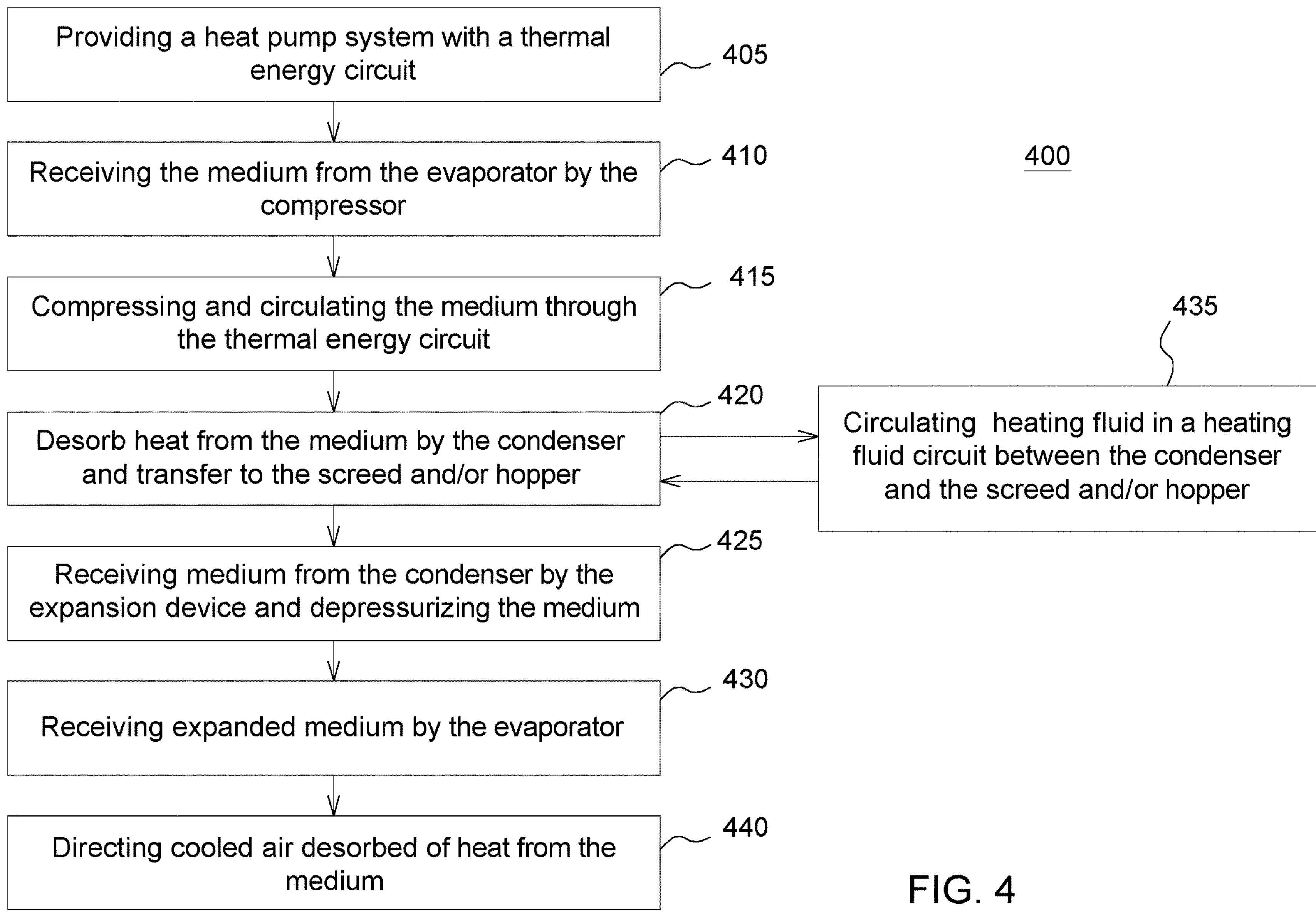
FIG. 4 is a flowchart illustrating the steps of a method of redistributing thermal energy on a paver work machine.

The method 400 of managing thermal energy in a paver work machine 100 is shown in FIG. 4 and includes the following steps. In a first step 405, the method includes providing a heat pump system 305 with a thermal energy circuit 315 circulating a medium 320 through an evaporator 325, a compressor 330, a condenser 335, and an expansion device 340. In a next step 410, the method includes receiving the medium 320 from the evaporator 325 by the compressor 330. Next, the method 415 includes compressing and circulating the medium 320 through the thermal energy circuit 315. In a next step 420, the method includes desorbing heat from the medium 320 by the condenser 335 and subsequently transferring the desorbed heat 390 from the condenser 335 to one of the screed and the hopper 115. The method then includes step 425 of controlling a flow of the medium 320 by the expansion device 340. The method then includes step 430 which includes receiving the medium 320 from the expansion device 340 by the evaporator 325, and transferring heat 390 to the medium 320 by the evaporator 325. In a first embodiment, these steps present a unidirectional closed loop method of thermal energy or heat distribution during the paving process. In another embodiment, the method may further include step 435 of circulating a heating fluid by a pump 355 in a heating fluid circuit 365 between the condenser 335 and one of the screed and the hopper 115 to transfer the desorbed heat 390 from the condenser 335 to one of the screed and the hopper 115, wherein a controller 345 controls a rate of diversion of the heat 390 by adjusting a flow rate of the heating fluid 360 output by the pump 355. Contingent on placement of the elements of the thermal management system, and space requirements, the thermal management system 300 may function with or without the heating fluid circuit 365. Next, the method may include step 440 of directing the cooled air 380 desorbed of heat 390 from the medium 320 by the evaporator 325 through an air distribution system 375 to a cool air outlet 385. Transferring the desorbed heat 390 from the condenser 335 to either the screed or the hopper 115 may include a blower 397 for distributing heated air sourced from air near one of the thermal energy circuit 315 and the heating fluid circuit 365, towards a surface contacting the paving material 120.

The heat pump system 305 comprises a thermal energy circuit 315 for circulating a medium 320 through an evaporator 325, a compressor 330, a condenser 335, and an expansion device 340.

The evaporator 325 adapts the medium 320 to absorb thermal energy from air.

The compressor 330 is coupled to the evaporator 325 and compresses the medium 320 which absorbed the thermal energy. The condenser 335 is coupled to the compressor 330 and adapts the medium 320 to release the compressed thermal energy to one of the hopper 115, the screed, and a paver work machine component 310 contacting the paving material 120.

An expansion device 340 is coupled to the condenser 335 and is adapted to control the flow of the medium 320. A controller 345 is adapted to control diversion of the thermal energy throughout the heat pump system 305.

The thermal energy circuit 315 comprises of a closed-loop system 350 that allows for continuous circulation of the medium 320 and exchange of the thermal energy. Circulation of the medium 320 flows in one direction.

The heat pump system 305 further comprises a pump 355. The controller 345 further controls a rate of diversion of the thermal energy by adjusting a pump rate of the medium 320 by a pump 355 coupled to the thermal circuit.

The heat pump system 305 may be powered by a separate power source of may be integrated with the prime mover 102 of the paver work machine 100.

The heat pump system 305 may further comprise of an air distribution system 375 for directing cooled air 380 to different areas within a paver work machine 100.

A technical effect of the thermal management system 300 disclosed herein is efficient use of thermal energy throughout the paver work machine 100. Paving material, such as asphalt, must be maintained at high temperatures during the paving process. With the onset of battery electric work machines, optimizing energy consumption can benefit a work machine's design. Coupling a heat pump system 305 with paver work machine components 310 that contact paving material, or alternatively blowing heated air towards paving material, can help counter any ambient cooling effects and improve temperature homogeneity and maintenance of the paving material. Generally, a paving material (e.g. an asphalt mix) is received at temperatures between 275 and 300 degrees Fahrenheit. Ambient air, variations in ground temperatures, long pauses in work, convection caused by moving traffic or long heat-up phases during cooler weather may play a role in how the paving material solidifies when spread and compacted. Cooler temperatures may yield a paved surface with sub-optimal density wherein the porosity enables too much water absorption. Furthermore, if the temperature of the paving material falls below 185 degrees Fahrenheit, the paving material may be too cool to be properly compacted. The thermal management system 300 disclosed herein provides an efficient way of keeping paving material temperatures consistent across the various stages. For example, a blowing of heated air towards a back surface 395 of the hopper 115 may maintain the temperature of the paving material before exiting to the longitudinal conveyer and is subsequently compacted unto the ground surface. In another exemplary embodiment, a heating fluid circuit may be coupled to a top surface of the base plate of the screed, or a immovable portion of the conveyer, or a back surface of the hopper to transfer heat to the paving material. Another technical effect of the one or more example embodiments disclosed herein, is sourcing thermal energy from ambient air, and redirecting the cooled air towards the operator. Excess cooled air may be released into the environment.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A paver work machine comprising:

a hopper adapted to receive and distribute a paving material;

a screed adapted to level the paving material on a ground surface;

a heat pump system including:

a thermal energy circuit for circulating a medium through an evaporator, a compressor, a condenser, and an expansion device;

wherein the compressor is positioned within the thermal energy circuit to receive the medium from the evaporator and is operable to compress and circulate the medium through the thermal energy circuit;

wherein the condenser is positioned within the thermal energy circuit to receive the medium from the compressor;

wherein the expansion device is positioned within the thermal energy circuit to receive the medium from the condenser and is operable to control a flow of the medium in the thermal energy circuit;

wherein the evaporator is positioned within the thermal energy circuit to receive the medium from the expansion device and is operable to transfer a heat to the medium;

wherein the condenser is operable to desorb heat from the medium and adapted to transfer heat desorbed from the medium to one of the hopper, and the screed; and a controller adapted to control heat transfer between the condenser and one of the screed and the hopper.

2. The paver work machine of claim 1, wherein the heat pump system further comprises a blower for distributing heated air around the thermal energy circuit, towards a surface contacting the paving material.

3. The paver work machine of claim 1, wherein the heat pump system further comprises an air distribution system for directing cooled air from the evaporator to a cool air outlet.

4. The paver work machine of claim 1, wherein the controller operates transferring heat between the condenser and one of the screed and the hopper within a defined ambient air temperature range.

5. The paver work machine of claim 1, wherein the thermal energy circuit comprises a closed-loop system that allows for continuous circulation of the medium and exchange of thermal energy.

6. The paver work machine of claim 5, wherein the circulation of the medium flows in one direction.

7. The paver work machine of claim 1, wherein the heat pump system further comprises a pump circulating a heating fluid through a heating fluid circuit, between the condenser and the one of the screed and the hopper to transfer the heat from the condenser to one of the screed and the hopper, wherein the controller controls the rate of diversion of the heat by adjusting a flow rate of the heating fluid output by the pump.

8. The paver work machine of claim 7, wherein the heating fluid circuit engages a back surface of one of the hopper and the screed.

9. The paver work machine of claim 7, wherein the heat pump system further comprises a pump circulating a heating fluid through a heating fluid circuit, between the condenser and a longitudinal conveyer.

10. The paver work machine of claim 7, wherein the heat pump system further comprises a blower for distributing heated air around the heating fluid circuit, towards a surface contacting the paving material.

11. The paver work machine of claim 1, wherein the compressor of the heat pump system is powered by a prime mover.

12. The paver work machine of claim 11, wherein the prime mover is an electric power source.

13. A method of managing thermal energy in a paver work machine, the method comprising:

providing a heat pump system with a thermal energy circuit circulating a medium through an evaporator, a compressor, a condenser, and an expansion device;

receiving the medium from the evaporator by the compressor;

compressing and circulating the medium through the thermal energy circuit;

receiving the compressed medium from the compressor by the condenser;

desorbing a heat from the medium by the condenser;

transferring the desorbed heat from the condenser to one of the screed and the hopper;

controlling a flow of the medium from the condenser by the expansion device;

receiving the medium from the expansion device by the evaporator; and transferring heat to the medium by the evaporator.

14. The method of claim 13 further comprising:

directing a cooled air desorbed of the heat from the medium by the evaporator through an air distribution system to a cool air outlet.

15. The method of claim 13 wherein the thermal energy circuit comprises a closed-loop system that allows for continuous circulation of the medium and exchange of thermal energy.

16. The method of claim 15 wherein the circulation of the medium flows in one direction.

17. The method of claim 13 further comprising:

circulating a heating fluid by a pump in a heating fluid circuit between the condenser and a one of the screed and the hopper to transfer the desorbed heat from the condenser to the one of the screed and the hopper, wherein a controller controls a rate of diversion of the heat by adjusting a flow rate of the heating fluid output by the pump.

18. The method of claim 17, wherein the heating fluid circuit engages a back surface of one of the hopper and the screed.

19. The method of claim 17, wherein the heating fluid circuit circulates between the condenser and a longitudinal conveyer.

20. The method of claim 17, wherein transferring the desorbed heat from the condenser to one of the screed and the hopper includes a blower for distributing a heated air sourced from air near one of the thermal energy circuit and the heating fluid circuit, towards a surface contacting the paving material.

* * * * *